United States Patent [19]

Lawson

[11] 4,096,116

[45] Jun. 20, 1978

[54] SMOKE-RETARDANT CHLORINATED POLYMER COMPOSITIONS

[75] Inventor: David Francis Lawson, Uniontown, Ohio

[73] Assignee: The Firestone Tire & Rubber Company, Akron, Ohio

[21] Appl. No.: 728,815

[22] Filed: Oct. 1, 1976

Related U.S. Application Data

[63] Continuation-in-part of Ser. No. 632,334, Nov. 17, 1975, abandoned.

[51] Int. Cl.² ............................................... C08K 5/09
[52] U.S. Cl. ..................... 260/45.75 M; 260/45.7 R; 260/45.75 R; 260/45.75 P; 260/45.75 W
[58] Field of Search .................. 260/45.7 R, 45.75 M, 260/45.75 W, 45.75 P, 45.75 R; 252/8.1

[56] References Cited

U.S. PATENT DOCUMENTS

| 2,563,772 | 8/1951 | Cheney | 260/45.75 |
| 3,453,225 | 7/1969 | Pollock | 260/23 X |
| 3,935,142 | 1/1976 | Wilson | 260/23 |
| 3,945,974 | 3/1976 | Schwarcz et al. | 260/45.75 B |
| 3,956,139 | 5/1976 | Whelan | 260/45.75 B |
| 3,957,723 | 5/1976 | Lawson | 260/45.75 W |
| 3,965,068 | 6/1976 | Dickens | 260/45.75 W |
| 3,983,185 | 9/1976 | Dorfman et al. | 260/45.75 B |

FOREIGN PATENT DOCUMENTS

| 2,236,893 | 2/1975 | France. |
| 2,546,679 | 4/1976 | Germany. |

OTHER PUBLICATIONS

Flamability of Solid Plastics—vol. 7, 5-7-73, pp. 263 to 275—article by Sobolev et al.

Primary Examiner—V.P. Hoke

[57] ABSTRACT

The addition of cobalt, zinc, iron or manganese salts of hydroxycarboxylic or dicarboxylic acids containing 2 to 6 carbon atoms to halogenated polymer resin compositions greatly reduces the evolution of smoke when the compositions undergo combustion processes. These salts exhibit synergistic smoke suppressing action when used along with aluminum hydroxide.

8 Claims, No Drawings

SMOKE-RETARDANT CHLORINATED POLYMER COMPOSITIONS

RELATED APPLICATION

This application is a continuation-in-part of my copending application Ser. No. 632,334, filed Nov. 17, 1975, now abandoned.

BACKGROUND OF THE INVENTION

There is much art on flame-retardants, but little on smoke-retarders or suppressants. A paper entitled SMOKE GENERATION FROM THE BURNING OF SOME POLYMERIC MATERIALS BY Brauman et al, given at the 32nd Annular Technical Conference of the Society of Plastic Engineers held in San Francisco in May 1974 discusses the problem and the effect of several smoke deterrents, but does not suggest the invention. Mitchell U.S. Pat. No. 3,821,151 suggests the use of molybdenum oxide in conjunction with iron powder and copper oxide as a smoke retardant in polyvinyl chloride, but no data are given. Miscellaneous patents on smoke retardants for vinyl chloride resins include, for example, Frisch U.S. Pat. No. 3,725,319, Doerge et al U.S. Pat. Nos. 3,746,664 and 3,758,638, McRowe U.S. Pat. No. 3,819,577, McRowe U.S. Pat. No. 3,822,234, and King U.S. Pat. No. 3,900,441; but these include no suggestion of the invention.

SUMMARY OF THE INVENTION

It has been found that cobalt, zinc, iron and manganese salts of dicarboxylic and hydroxycarboxylic acids containing 2 to 6 carbon atoms are very effective smoke suppressants when added to halogen-containing polymers or copolymers, including chlorinated polyethylene and propylene, chlorinated paraffins, oils and waxes, polyvinylidene chloride and preferably vinyl chloride polymers and chlorinated vinyl chloride polymers and blends of the foregoing polymers. The chlorine content of polyvinyl chloride is about 57 percent. If copolymers of vinyl chloride are used, the chlorine content is less if the comonomer (such as vinyl acetate) does not contain chlorine, and is higher if the comonomer contains chloride, (such as vinylidene chloride). The chlorine content of chlorinated polyethylene, chlorinated polypropylene, or other chlorinated paraffins can vary over a wide range depending upon the physical properties desired in the polymer composition. Generally, a range of from about 5 to about 70 percent chlorine is present. The chlorine content of a flexible polyvinyl chloride composition will generally be less than 57 percent unless chlorinated plasticizer is present. Thus, the chlorine content of the polymer composition can range from about 5 to about 70 percent. The incorporation of the above-named salts retards and lessens the smoke generated by the burning polymer. One can use 1 to 10 parts by weight of the salts, or more, if desired, per 100 parts by weight of the polymer. Preferably there should be used 4 to 8 parts by weight of the salts per 100 parts by weight of the halogenated polymer.

The cobalt, zinc, iron, and manganese salts of hydroxy- and dicarboxylic acids, besides being excellent smoke retardants when used alone, have a particularly excellent synergistic effect when used in combination with hydrated aluminum hydroxide. Not only does there result a degree of smoke suppression greater than is obtained with the use of the individual materials, but also there is a substantial reduction in flammability. This last is particularly surprising, since the use of the fire retardant salts of the present invention alone sometimes results in a slight increase in flammability. To obtain this synergistic effect, the hydrated aluminum oxide should be used in amounts of from about 10 to as high as 150 parts by weight of aluminum hydroxide per 100 parts by weight of chlorine-containing polymer; the upper limit selected for said aluminum hydroxide is one based on practicality.

The acid moieties of the salts of cobalt, zinc, iron or manganese can be those of any aliphatic organic hydroxycarboxylic or dicarboxylic acid containing 2–6 carbon atoms; mixtures can be utilized. Examples of such acids include oxalic, malonic, succinic, glutaric, adipic and similar dicarboxylic acids; hydroxyacetic, tartaric, ascorbic, citric, hydroxypropionic and similar hydroxy acids.

Before referring to the results, it is advantageous to know the meaning of the terms utilized. Definitions follow.

NATIONAL BUREAU OF STANDARDS SMOKE DENSITY CHAMBER

Evaluations for the density of visible smoke were made using a commercial smoke density chamber modeled after one developed at the National Bureau of Standards by the Fire Research Group (see D. Gross, J. J. Loftus and A. F. Robertson, ASTM Special Technical Publication 422 pages 166–204 (1969).) This chamber contains a radiant heater producing 2.5 W/cm$^2$ of heat at the surface of a 3 × 3 inches sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as Specific Optical Density, $D_S$, where $$D_S = (V/AL) \log_{10}(T_o/T) = 132 \log_{10}(T_o/T)$$

$V$ = volume of chamber
$A$ = area of test specimen
$L$ = Length of light path
$T_o$ = initial light transmittance through the chamber
$T$ = transmittance of light during test At the peak of smoke build-up $D_S = D_m$, and for purposes of the report, corrected maximum smoke is recorded as $D_{mc} = D_m - D_c$ where $D_c$ is the clear beam specific optical density occurring after the smoke test, when the chamber has been exhausted of smoke. Lower values of $D_{mc}$ indicate less obscuration of light due to smoke.

Several other quantities measured include the time in minutes to 90 percent of $D_m$ (t.9 $D_m$) and the time (in minutes) to $D_S = 16$ ($t\, D_{16}$), which are indicative of the rate of smoke development (higher numbers signify slower rates), as well as the smoke obscuration number for the first 4 minutes of test, $SON_4$, where $$SON_4 = \frac{D_S(1\text{ min.}) + D_S(2\text{ min.}) + D_S(3\text{ min.}) + D_S(4\text{ min.})}{4}$$

which also represents the early rate of smoke development (lower numbers mean less smoke). The definitions of terms are summarized below.

$D_{mc}$ = Specific optical density at maximum smoke intensity, corrected for fogging of lens seals. $D_{mc} > 25$, light; 25-75, moderate; 100-400, dense; >400 very dense.

$t.9 D_m$ = time (minutes) to reach 90 percent of maximum optical density.

$tD_{16}$ = time (minutes) to $D = 16$; corresponds to early visibility obscuration. $tD_{16} < 1$, very fast; 1-3 fast; 4-6 moderate; 7-10 slow; >10, very slow smoker.

$SON_4$ = Smoke obscuration number over first four minutes of test, indicates amount of smoke vs. rate of build-up early in the test. $SON_4 < 3$, very low; 4-10, low; 10-50, moderate; 50-100, high; > 200, very high.

LOI is the abbreviation for Limiting Oxygen Index which is defined as the minimum volume percent oxygen content required in an oxygen/nitrogen mixture to maintain combustion of a vertical, top-lighted test specimen. The value is expressed in mathematical terms as follow:

$$LOI = \frac{[O_2]}{[O_2] + [N_2]} \times 100$$

where $[O_2]$ is the volume of oxygen and $[N_2]$ is the volume of nitrogen. The LOI is considered to be an accurate, reproducible determination of the flammability of materials. From a practical standpoint, an LOI value of greater than 25 generally means that the test specimen will be self-extinguishing. For a more detailed discussion of the LOI and method of determination, C. P. Fenimore and F. R. Martin's article in COMBUSTION AND FLAME 10 No. 2, page 135 (1966), should be consulted.

Limiting Oxygen Indices were obtained using the Michigan Chemical LOI apparatus. An Aminco-NBS smoke density chamber was used to obtain data on the rate of smoke generation as well as intensity of visible smoke.

| EXPERIMENTAL RESULTS | |
|---|---|
| Polyvinyl Chloride Resin ("FPC-965" a product of The Firestone Tire & Rubber Company) | 100 grams |
| Calcium Stearate | 2 grams |
| Dilauryl Tin Mercaptide | 3.75 grams |
| Smoke Suppressant (per Table I) | 5 grams |

A series of plaques was prepared in accordance with the foregoing recipe, using different smoke suppressants in the several runs as set forth in Table I. In each case, the ingredients in the recipe were compounded, in the order in which they are listed, on a laboratory roll mill heated at 350° F. (177° C.). The compounded material was then pressed into sheets 0.030 inch (0.762 mm.) thick in a laboratory press, the platens of which were heated at 345° F. (174° C.). Specimens from each sheet were submitted to NBS smoke density tests as described above. Also, specimens were pressed out at 345° F. (174° C.) with dimensions 0.25 × 5 × 1.0 inch (6.35 mm. × 127 mm. × 25.4 mm.) and subjected to oxygen index measurements as described above. Set forth herewith in Table I are the results of these experiments.

TABLE I

| Smoke Inhibitor Used | Color of Specimen | TEST RESULTS | | | | | Run No. |
|---|---|---|---|---|---|---|---|
| | | LOI | $D_{mc}$ | $t.9D_m$ | $tD_{16}$ | $SON_4$ | |
| None (Control) | light yellow | 45.1 | 357 | 2.67 | 0.42 | 272 | 1 |
| Cobalt oxalate | light blue | 43.4 | 273 | 2.43 | 0.45 | 214 | 2 |
| Zinc Tartrate | light yellow | 48.9 | 294 | 2.47 | 0.40 | 256 | 3 |
| Ferric Tartrate | dark brown | 40.9 | 283 | 2.93 | 0.38 | 223 | 4 |
| Manganese Tartrate | light tan-yellow | 43.0 | 317 | 2.16 | 0.39 | 265 | 5 |
| Barium Tartrate | light yellow | 39.9 | 432 | 3.16 | 0.37 | 342 | 6 |

TABLE II

| Smoke Inhibitor Used | Color of Specimen | TEST RESULTS | | | | | Run No. |
|---|---|---|---|---|---|---|---|
| | | LOI | $D_{mc}$ | $t.9D_m$ | $tD_{16}$ | $SON_4$ | |
| None | cream | 49.0 | 284 | 3.20 | 0.48 | 206 | 7 |
| Cobalt Oxalate | light blue | 57.4 | 216 | 3.34 | 0.56 | 145 | 8 |
| Zinc Tartrate | pale yellow | 59.4 | 206 | 2.81 | 0.56 | 142 | 9 |
| Ferric Tartrate | brown | 52.1 | 177 | 3.88 | 0.74 | 110 | 10 |

Runs Nos. 1-6 show the different effects of the various compounds added. Thus cobalt oxalate, zinc tartrate, ferric tartrate, and manganese tartrate of the present invention (Runs Nos. 2-5) decreased the smoke in relation to the control (Run No. 1). Barium tartrate increased the smoke.

Runs Nos. 7-10 of Table II illustrate the synergistic effect of the smoke suppressants of the present invention when used in connection with aluminum hydroxide, which itself is used as a flame retardant and smoke suppressant for a variety of resins.

The compositions of Table II contained, in addition to the ingredients of the foregoing recipe and the indicated smoke inhibitors, 30 grams of hydrated aluminum oxide (aluminum hydroxide, $Al(OH_3)$ ). Comparing the control Run No. 1 of Table I with the other runs, in Run No. 7 of Table II, the aluminum hydroxide alone cuts down the visible smoke ($D_{mc}$) by 20%, and at the same time, increases LOI by 9% (decreased flammability). In contrast, ferric tartrate alone (Run No. 4) cuts down visible smoke ($D_{mc}$) by 20%, but decreases LOI by 10% (increased flammability). However, when both are used together (Run No. 10), the visible smoke ($D_{mc}$) is reduced by 50% and the LOI (inverse to flammability) is increased by 15%.

It is understood that the preceding examples are representative and that they can be varied within the context of my total specification, as it would be understood by one skilled in the art, to achieve substantially the same results.

What is claimed is:

1. A polymer composition having a reduced tendency to smoke under combustion conditions, said composition consisting essentially of (a) 100 parts by weight of at least one polymer having a chlorine content of from about 5 to about 70%, based on the weight of said polymer, said polymer being chlorinated polyethylene, chlorinated polypropylene, polyvinylidene chloride, polyvinyl chloride or chlorinated polyvinyl chloride, and, (b) from 1 to 10 parts of a cobalt salt of a dicarboxylic aliphatic acid or a hydroxycarboxylic acid containing 2 to 6 carbon atoms.

2. A polymer composition having a reduced tendency to smoke under combustion conditions, said composition consisting essentially of (a) 100 parts by weight of at least one polymer having a chlorine content of from about 5 to about 70%, based on the weight of said polymer, said polymer being chlorinated polyethylene, chlorinated polypropylene, polyvinylidene chloride, polyvinyl chloride or chlorinated polyvinyl chloride, and, (b) 1 to 10 parts of a manganese salt of a dicarboxylic aliphatic acid or a hydroxycarboxylic acid containing 2 to 6 carbon atoms.

3. A polymer composition having a reduced tendency to smoke under combustion conditions, said composition consisting essentially of (a) 100 parts by weight of polyvinyl chloride having a chlorine content of from about 5 to about 70%, based on the weight of said polymer, and, (b) from 1 to 10 parts of a cobalt salt of a dicarboxylic aliphatic acid or a hydroxycarboxylic acid containing 2 to 6 carbon atoms.

4. A polymer composition having a reduced tendency to smoke under combustion conditions, said composition consisting essentially of (a) 100 parts by weight of polyvinyl chloride having a chlorine content of from about 5 to about 70%, based on the weight of said polymer, and, (b) from 1 to 10 parts of a manganese salt of a dicarboxylic aliphatic acid or a hydroxycarboxylic acid containing 2 to 6 carbon atoms.

5. A polymer composition having reduced flammability and reduced tendency to smoke under combustion conditions, said composition consisting essentially of (a) 100 parts by weight of at least one polymer having a chlorine content of from about 5 to about 70%, based on the weight of said polymer, said polymer being chlorinated polyethylene, chlorinated polypropylene, polyvinylidene chloride, polyvinyl chloride or chlorinated polyvinyl chloride, and, (b) from 1 to 10 parts cobalt oxalate, and (c) from about 10 to about 150 parts by weight aluminum hydroxide.

6. A polymer composition having reduced flammability and reduced tendency to smoke under combustion conditions, said composition consisting essentially of (a) 100 parts by weight of at least one polymer having a chlorine content of from about 5 to about 70%, based on the weight of said polymer, said polymer being chlorinated polyethylene, chlorinated polypropylene, polyvinylidene chloride, polyvinyl chloride or chlorinated polyvinyl chloride, and, (b) from 1 to 10 parts manganese tartrate, and (c) from about 10 to about 150 parts by weight aluminum hydroxide.

7. A polymer composition having reduced flammability and reduced tendency to smoke under combustion conditions, said composition consisting essentially of (a) 100 parts by weight of polyvinyl chloride having a chlorine content of from about 5 to about 70%, based on the weight of said polymer, and, (b) from 1 to 10 parts cobalt oxalate, and (c) from about 10 to about 150 parts by weight aluminum hydroxide.

8. A polymer composition having reduced flammability and reduced tendency to smoke under combustion conditions, said composition consisting essentially of (a) 100 parts by weight of polyvinyl chloride having a chlorine content of from about 5 to about 70%, based on the weight of said polymer, and, (b) from 1 to 10 parts manganese tartrate, and (c) from about 10 to about 150 parts by weight aluminum hydroxide.

* * * * *